(12) United States Patent
Kismarton

(10) Patent No.: US 7,740,932 B2
(45) Date of Patent: Jun. 22, 2010

(54) HYBRID FIBERGLASS COMPOSITE STRUCTURES AND METHODS OF FORMING THE SAME

(75) Inventor: Max U. Kismarton, Renton, WA (US)

(73) Assignee: The Boeing Company, Chicago, IL (US)

(*) Notice: Subject to any disclaimer, the term of this patent is extended or adjusted under 35 U.S.C. 154(b) by 1463 days.

(21) Appl. No.: 11/096,796

(22) Filed: Mar. 31, 2005

(65) Prior Publication Data

US 2006/0219845 A1    Oct. 5, 2006

(51) Int. Cl.
*D04H 1/00* (2006.01)
*B64C 1/00* (2006.01)

(52) U.S. Cl. ..................... 428/292.1; 244/133

(58) Field of Classification Search ............... 428/292.1, 428/297.1, 297.7, 299.4, 300.7, 411.1; 233/144
See application file for complete search history.

(56) References Cited

U.S. PATENT DOCUMENTS

| | | |
|---|---|---|
| 2,108,041 A | 2/1938 | Colvin Jr. |
| 3,266,130 A | 8/1966 | Glaze |
| 3,381,484 A | 5/1968 | Laughlin |
| 3,490,983 A | 1/1970 | Lee |
| 3,768,760 A | 10/1973 | Jensen |
| 3,975,916 A | 8/1976 | Watson |
| 3,976,269 A | 8/1976 | Gupta |
| 3,983,900 A | 10/1976 | Airhart |
| 4,084,029 A | 4/1978 | Johnson et al. |
| 4,098,559 A | 7/1978 | Price |
| 4,177,306 A | 12/1979 | Schulz et al. |
| 4,198,018 A | 4/1980 | Brault |
| 4,207,778 A | 6/1980 | Hatch |
| 4,232,844 A | 11/1980 | Sobey |
| 4,310,132 A | 1/1982 | Robinson et al. |
| 4,368,234 A | 1/1983 | Palmer et al. |
| 4,379,798 A | 4/1983 | Palmer et al. |
| 4,413,110 A | 11/1983 | Kavesh et al. |
| 4,425,980 A | 1/1984 | Miles |
| 4,627,791 A | 12/1986 | Marshall |
| 4,712,533 A | 12/1987 | Cruise |
| 4,734,146 A | 3/1988 | Halcomb et al. |

(Continued)

FOREIGN PATENT DOCUMENTS

DE    202004007601 U1    12/2004

(Continued)

OTHER PUBLICATIONS

Gay, "Materiaux Composites," Hermes, Paris, 4th edition, 1997, pp. 107-109.

(Continued)

*Primary Examiner*—D. Lawrence Tarazano
*Assistant Examiner*—Camie S Thompson

(57) ABSTRACT

Hybrid fiberglass composite structures and methods for forming the same are disclosed. In one embodiment, a hybrid fiberglass composite structure includes a first laminate substrate and a second opposing laminate substrate. At least one of the first laminate substrate and the second laminate substrate includes at least one polymer fiber layer and at least one glass fiber layer. A cellular core structure is interposed between the first laminate substrate and the second laminate substrate and fixedly coupled to the first laminate substrate and the second laminate substrate.

15 Claims, 4 Drawing Sheets

U.S. PATENT DOCUMENTS

| | | | |
|---|---|---|---|
| 4,741,943 A | 5/1988 | Hunt | |
| 4,808,461 A | 2/1989 | Boyce et al. | |
| 4,908,254 A | 3/1990 | Fischer et al. | |
| 4,966,802 A | 10/1990 | Hertzberg | |
| 5,096,772 A | 3/1992 | Snyder | |
| 5,154,370 A | 10/1992 | Cox et al. | |
| 5,164,255 A | 11/1992 | Weeks | |
| 5,242,523 A | 9/1993 | Willden et al. | |
| 5,269,657 A | 12/1993 | Garfinkle | |
| 5,306,557 A | 4/1994 | Madison | |
| 5,333,568 A | 8/1994 | Meldner et al. | |
| 5,342,465 A | 8/1994 | Bronowicki et al. | |
| 5,362,345 A | 11/1994 | Stettler et al. | |
| 5,429,066 A | 7/1995 | Lewit et al. | |
| 5,429,326 A | 7/1995 | Garesche et al. | |
| 5,476,704 A | 12/1995 | Kohler | |
| 5,518,208 A | 5/1996 | Roseburg | |
| 5,538,781 A | 7/1996 | Rao et al. | |
| 5,632,940 A | 5/1997 | Whatley | |
| 5,669,999 A | 9/1997 | Anderegg et al. | |
| 5,735,486 A | 4/1998 | Piening et al. | |
| 5,766,724 A | 6/1998 | Tailor et al. | |
| 5,833,786 A | 11/1998 | McCarville et al. | |
| 5,866,272 A | 2/1999 | Westre et al. | |
| 5,922,446 A | 7/1999 | Piening et al. | |
| 5,958,550 A | 9/1999 | Childress | |
| 5,972,524 A | 10/1999 | Childress | |
| 6,024,325 A | 2/2000 | Carter, Jr. | |
| 6,037,060 A | 3/2000 | Blohowiak et al. | |
| 6,114,050 A | 9/2000 | Westre et al. | |
| H1872 H | 10/2000 | Bowman | |
| 6,277,463 B1 | 8/2001 | Hamilton et al. | |
| 6,291,049 B1 * | 9/2001 | Kunkel et al. | 428/99 |
| 6,306,239 B1 | 10/2001 | Breuer et al. | |
| 6,320,118 B1 | 11/2001 | Pridham et al. | |
| 6,355,337 B1 | 3/2002 | Piening et al. | |
| 6,355,584 B1 | 3/2002 | Corrons | |
| 6,372,072 B1 | 4/2002 | Healey | |
| 6,405,978 B1 | 6/2002 | Dean et al. | |
| 6,436,507 B1 | 8/2002 | Pannell | |
| 6,502,788 B2 | 1/2003 | Noda et al. | |
| 6,511,570 B2 | 1/2003 | Matsui | |
| 6,554,225 B1 | 4/2003 | Anast et al. | |
| 6,565,944 B1 | 5/2003 | Hartness et al. | |
| 6,641,693 B2 | 11/2003 | Guckert et al. | |
| 6,641,893 B1 | 11/2003 | Suresh et al. | |
| 6,655,633 B1 | 12/2003 | Chapman, Jr. | |
| 6,703,118 B2 | 3/2004 | van Weperen et al. | |
| 6,729,792 B2 | 5/2004 | Pritzer | |
| 6,779,830 B2 | 8/2004 | Patberg et al. | |
| 6,835,341 B2 | 12/2004 | Noda et al. | |
| 6,914,021 B2 | 7/2005 | Sidwell | |
| 7,080,805 B2 | 7/2006 | Prichard et al. | |
| 7,115,323 B2 | 10/2006 | Westre et al. | |
| 7,159,822 B2 | 1/2007 | Grantham et al. | |
| 2002/0015819 A1 | 2/2002 | Edwards et al. | |
| 2003/0148082 A1 | 8/2003 | Bompard et al. | |
| 2003/0168555 A1 | 9/2003 | Livi et al. | |
| 2003/0189131 A1 | 10/2003 | Cloud et al. | |
| 2004/0024502 A1 | 2/2004 | Squires et al. | |
| 2004/0191472 A1 * | 9/2004 | Adolphs | 428/102 |
| 2004/0213952 A1 | 10/2004 | Takemura et al. | |
| 2004/0265536 A1 | 12/2004 | Sana et al. | |
| 2005/0153098 A1 | 7/2005 | Bhatnagar et al. | |
| 2005/0250440 A1 | 11/2005 | Zhou et al. | |
| 2005/0263645 A1 | 12/2005 | Johnson et al. | |
| 2006/0226287 A1 | 10/2006 | Grantham et al. | |
| 2006/0237588 A1 | 10/2006 | Kismarton | |

FOREIGN PATENT DOCUMENTS

| | | |
|---|---|---|
| EP | 0433686 A1 | 6/1991 |
| EP | 1174533 A1 | 1/2002 |
| EP | 1336469 A1 | 8/2003 |
| EP | 1762666 A1 | 3/2007 |
| FR | 2660892 | 10/1991 |
| GB | 2238977 A | 6/1991 |
| JP | 2003066968 | 3/2003 |
| WO | WO9640551 | 12/1996 |
| WO | WO0216197 A1 | 2/2002 |
| WO | WO0216784 A2 | 2/2002 |

OTHER PUBLICATIONS

Garfinkle et al., "Aerospace: Smart Spars, Intrinsically-Smart Composite Structures", Fiber Architects, High Performance Textile Consultants, http://fiberarchitects.com/aerospace/spar.html, pp. 1-8, Jan. 1999.

PCT International Search Report, mailed on Sep. 11, 2006, Application No. PCT/US2006/010974, filed on Mar. 24, 2006, 3 pages.

* cited by examiner

US 7,740,932 B2

HYBRID FIBERGLASS COMPOSITE STRUCTURES AND METHODS OF FORMING THE SAME

CROSS REFERENCE TO RELATED APPLICATIONS

This patent application is related to co-pending, commonly-owned U.S. patent application Ser. No. 11/096,795 entitled "Composite Structural Member Having an Undulating Web and Method for Forming the Same" filed under Attorney Docket No. BING-1-1133; U.S. patent application Ser. No. 11/096,743 entitled "Composite Structural member and Method for Forming the Same" filed under Attorney Docket No. BING-1-1151; U.S. patent application Ser. No. 11/096,727 entitled "Multi-Axial Laminate Composite Structures and Methods of Forming the Same" filed under Attorney Docket No. BING-1-1150; which applications are incorporated herein by reference.

FIELD OF THE INVENTION

This invention relates generally to composite structures, and more specifically, to hybrid fiberglass composite structures.

BACKGROUND OF THE INVENTION

Fiberglass is a rigid composite structural material having reinforcement fibers embedded in a resinous material. Structures formed from fiberglass advantageously have inherently high structural strength while also being relatively low in overall weight. Accordingly, fiberglass structures are used in flight vehicles, as well as a variety of terrestrial vehicles, such as automobiles and boats.

With respect to fiberglass structures used in flight vehicles, the fiberglass structures may be employed in the fabrication of primary or secondary structures, but are particularly useful in the fabrication of secondary structural components that are not subject to primary flight loads.

One drawback associated with the use of conventional fiberglass materials in primary and/or secondary structural applications is that the material is generally formed into relatively thick layers in order to offer good resistance to damage that may result from hail and/or relatively heavy rain that may impact the fiberglass component. As a consequence, the relatively thick fiberglass layers often undesirably add weight to the vehicle.

Therefore, there exists an unmet need in the art for a structural material having higher resistance to impact damage while providing lower weight than heretofore possible.

SUMMARY

The various embodiments of the present invention are directed to a hybrid fiberglass composite structures and methods of forming the same. Embodiments of the present invention generally provide lower weight than comparable conventional fiberglass structures while providing enhanced resistance to impact damage. The present embodiments may thus be applied to primary and/or secondary structural components in commercial, non-commercial and military aircraft, as well as in other similar applications.

In one aspect, a hybrid fiberglass composite structure includes a first laminate substrate and a second opposing laminate substrate. At least one of the first laminate substrate and the second laminate substrate includes at least one polymer fiber layer and at least one glass fiber layer. A cellular core structure is interposed between the first laminate substrate and the second laminate substrate and fixedly coupled to the first laminate substrate and the second laminate substrate.

BRIEF DESCRIPTION OF THE DRAWINGS

The various embodiments of the present invention are described in detail below with reference to the following drawings.

DETAILED DESCRIPTION

The present invention relates to a hybrid fiberglass composite structures and methods for forming the same. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

Figure 1:
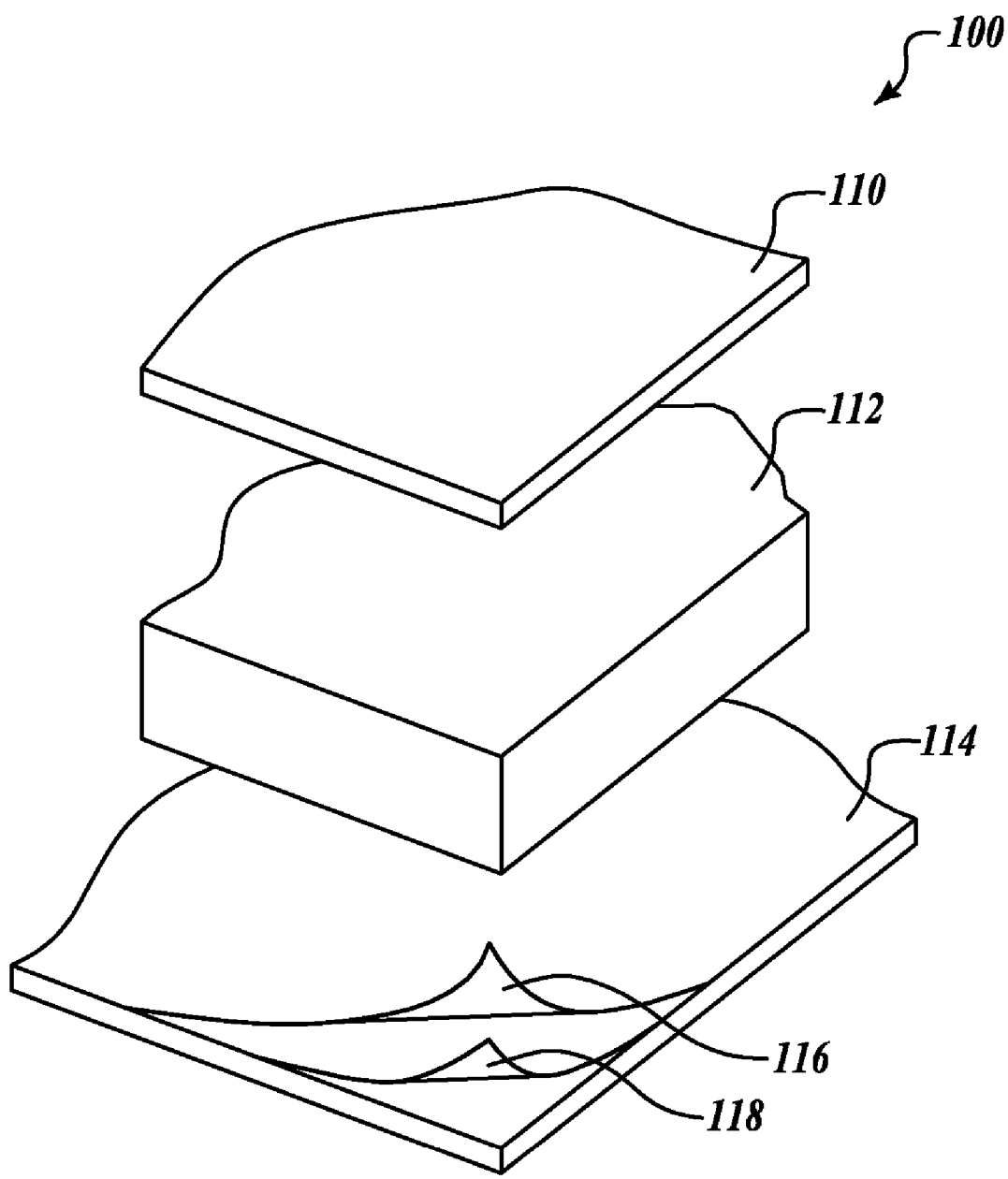
FIG. 1 is an exploded partial isometric view of a hybrid fiberglass composite structure, according to an embodiment of the present invention.

FIG. 1 is an exploded, partial isometric view of a hybrid fiberglass composite structure 100. The hybrid fiberglass composite structure 100 includes a first laminate substrate 110, a second laminate substrate 114 and a cellular core structure 112 interposed between the first laminate substrate 110 and the second laminate substrate 114. At least one of the first laminate substrate 110 and the second laminate substrate 114 includes one or more polymer fiber layers 118 and glass fiber layers 116 that are embedded in a suitable resin material, as will be described in further detail below.

The one or more polymer fiber layers 118 may be combined with the one or more glass fiber layers 116 to form the hybrid fiberglass laminate composite structure 100 in any desired pattern. For example, the glass fiber layers 116 may include a woven network of glass fibers, as is known in the art, while the polymer fibers 118 are positioned adjacent to the woven network and oriented in a predetermined direction. Alternately, the polymer fibers 118 may be formed into a woven network of fibers. The glass fiber layers 116 may also include individual strands of glass fibers that may be also oriented in a predetermined direction. Alternately, the polymer fiber layers 118 and the glass fiber layers 116 may be positioned within the first laminate substrate 110 and/or the second laminate substrate 114 in respective planar layers each having a substantially random planar orientation of the glass fibers and the polymer fibers.

The polymer fiber layer 118 may be comprised of polypropylene, polyurethane or other similar polymer fibers, but in a particular embodiment, the polymer fiber layer 118 is comprised of stretched polyethylene fibers having an average molecular weight of at least about $5 \times 10^5$ and having a tenacity of at least about 20 g/denier, a tensile modulus of at least about 500 g/denier, a creep value not greater than about 5%, a porosity less than about 10% and a melting temperature of at least about 147 degrees Celsius. As disclosed in detail in U.S. Pat. No. 4,413,110 entitled "High Tenacity, High Modulus Polyethylene and Polypropylene Fibers and Intermediates Therefore", which application is incorporated by reference herein. In another particular embodiment, the polymer fiber layer 118 may include the SPECTRA polyethylene fibers, which are commercially available from the Honeywell Corporation of Morristown, N.J., although other suitable alternatives exist. In other particular embodiments, the polymer fiber layer 118 may include of polyethylene polymer fibers in combination with other polymer fibers.

The polymer fiber layer 118 may also be comprised of liquid crystalline polymer (LCP) fibers. Briefly and in general terms, LCP polymers combine the properties of polymer fibers with those of liquid crystal fibers. Accordingly, LCP fibers at least partially exhibit the same mesophases characteristic of ordinary liquid crystal fibers, yet retain many of the useful and desirable properties of polymer fibers, which may include, for example, significant strength and weight savings. In a particular embodiment, the LCP fibers may include the VECTRAN LCP fibers, available from the Hoechst Celanese Corporation of Portsmouth, Va., although other suitable alternatives are available.

Still referring to FIG. 1, the cellular core structure 112 is positioned between the first laminate structure 110 and the second laminate structure 114. The first laminate substrate 110 and the second laminate substrate 114 are fixedly coupled to the cellular core structure 112 so that the first laminate substrate 110, the second laminate substrate 114 and the cellular core structure 112 to form a rigid unitary structure. The first and second laminate substrates 110 and 114 may be fixedly coupled to the core structure 112 by bonding the first and second laminate substrates 110 and 114 to the core structure 112 using a suitable adhesive material. Alternately, the first and second laminate substrates 110 and 114 may be bonded to the core structure 112 by thermally fusing the first and second laminate substrates 110 and 114 to the core structure 112. In any case, the cellular core structure 112 may include a honeycomb core structure, although other core structure configurations may also be used. Suitable cellular core structures may include the HEXCEL phenolic/fiberglass honeycomb material available from Hexcel Composites, Incorporated, of Stamford Conn., although other suitable alternatives are available. In other embodiments, the cellular core structure 112 may include expanded metal structures such as a metallic honeycomb material.

Figure 2:
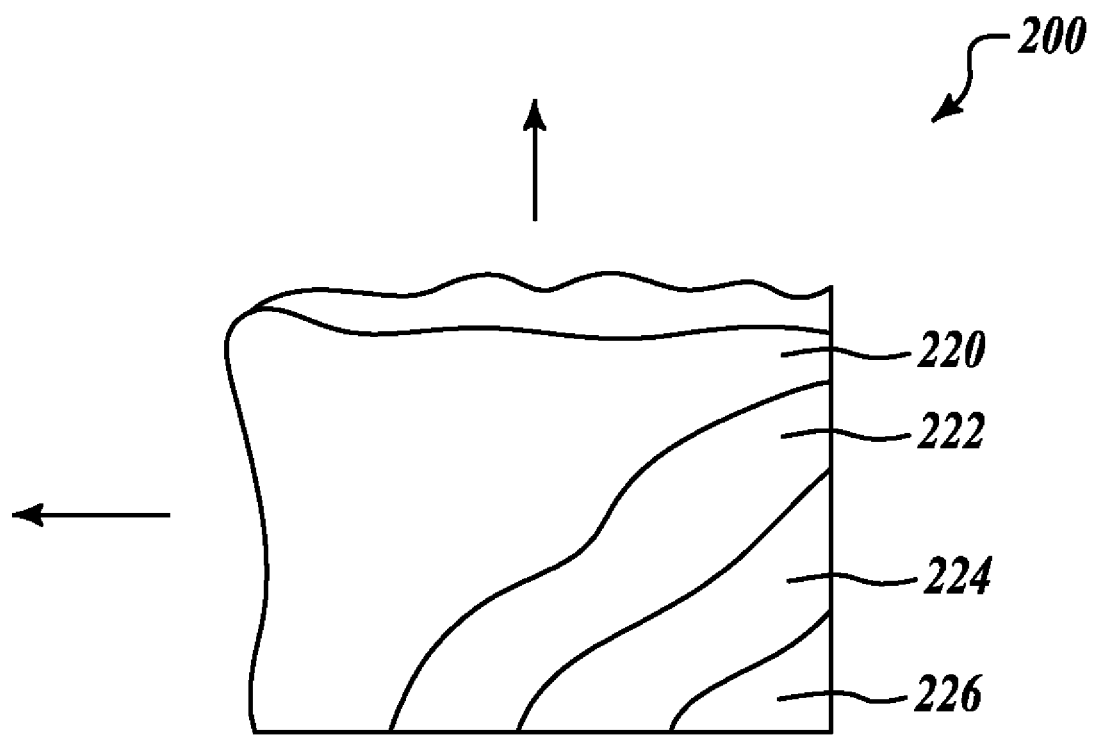
FIG. 2 is a partial cutaway plan view of a laminate substrate, according to another embodiment of the present invention.

FIG. 2 is a partial cutaway plan view of a laminate substrate 200 according to another embodiment of the invention. The substrate 200 may form a selected one of the first laminate substrate 110 or the second laminate substrate 114 of FIG. 1, or the substrate 200 may form both of the substrates 110 and 114 of FIG. 1. The laminate substrate 200 includes a first resin layer 220 having at least one underlying polymer fiber layer 222. At least one glass fiber layer 224 underlies the at least one polymer fiber layer 222 and is positioned on a second resin layer 226. The first resin layer 220, the at least one polymer fiber layer 222, the at least one glass fiber layer 224 and the second resin layer 226 are mutually, bonded together to form a rigid unitary assembly. The at least one polymer fiber layer 222 and the at least one glass fiber layer 224 may be present in the laminate substrate 200 in any desired proportion. For example, the laminate substrate 200 may include predominately glass fiber layers 224, or it may include predominately polymer fiber layers 222. In one particular embodiment, the glass fiber layers 224 and the polymer fiber layers 222 are present in the laminate substrate 200 in a ratio of approximately about one to three. Alternately, the laminate substrate 200 may include the glass fiber layers 224 and the polymer fiber layers 222 in approximately equal proportions.

The first resin layer 220 and the second resin layer 226 may include any thermosetting or thermoforming material, including various well-known epoxy resins. The fiber layers 222 may include a resin matrix (not shown in FIG. 2) that retains the fiber layers 222. In one embodiment, the resin matrix may comprise a thermosetting material that permits the laminate 200 to be heat cured. One skilled in the art will appreciate, however, that other suitable resins are available. In other embodiments, the resins may be formed with the fibers 222 into pre-assembled ("pre-preg") layers, which include the multiple fiber layers 222. A plurality of pre-pregs may also be assembled to form the laminate 200.

Figure 3:
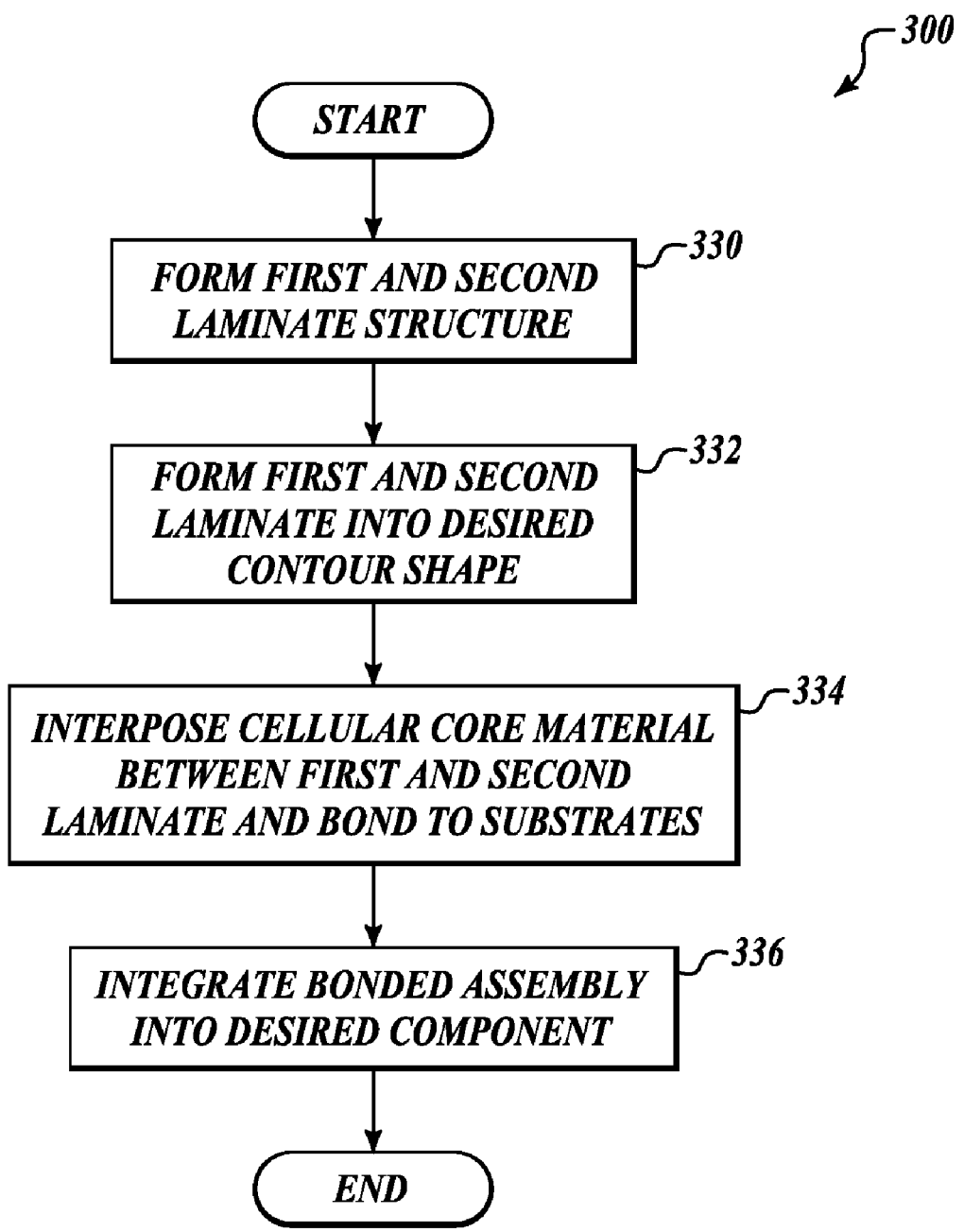
FIG. 3 is a block diagrammatic view of a method for forming a hybrid fiberglass composite structure, according to still another embodiment of the present invention.

FIG. 3 is a block diagrammatic view of a method 300 of forming a hybrid fiberglass composite structure according to still another embodiment of the invention. At block 330, glass fiber layers are combined with polymer fiber layers to form a laminate substrate, as described in detail above in connection with FIG. 1 and FIG. 2. The laminate substrate formed at block 330 may then be conformed to a desired contoured shape at block 332. The laminate substrate may be contoured by subjecting the substrate to a thermal process and impressing the substrate against a forming die to impart a desired contour shape to the substrate. Appropriate contours may include, for example, a contoured shape appropriate for a selected aircraft structure, such as a leading edge wing panel and/or a trailing edge wing panel, although other primary and/or secondary structures may include wing-fuselage fairings, radomes, or other similar structures. At block 334, a cellular core structure is interposed between a pair of opposed laminate substrates and bonded to the substrates. As described above in connection with FIG. 1, one or both of the laminate substrates may include glass fiber layers and polymer fiber layers. At block 336, the structure formed at block 334 may be integrated into a desired component by coupling attachment points, mounting brackets or other devices into the structure.

Figure 4:
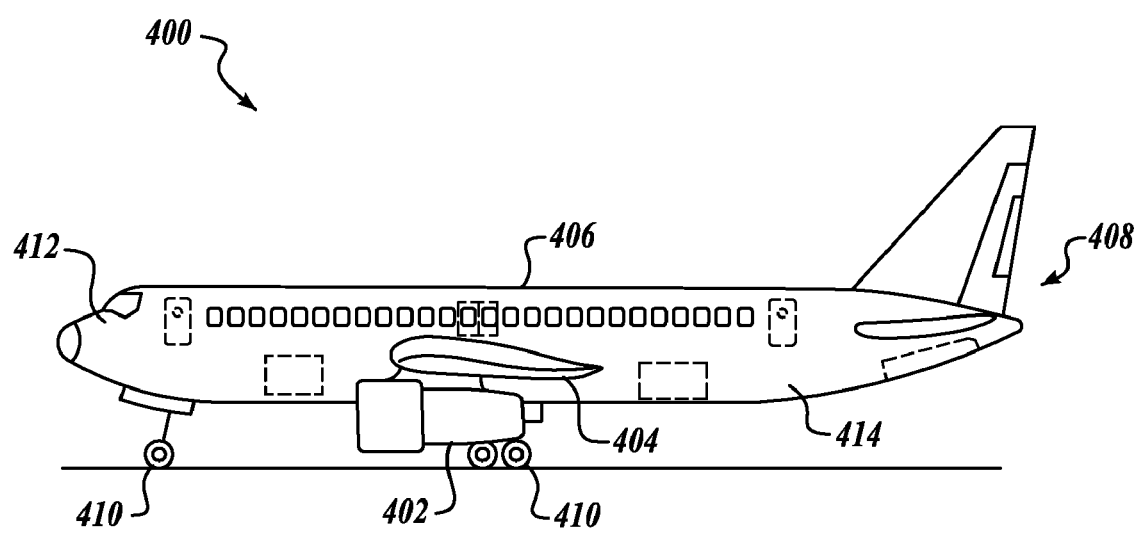
FIG. 4 is a side elevation view of an aircraft having one or more components in accordance with an embodiment of the present invention.

Those skilled in the art will readily recognize that the foregoing embodiments may be incorporated into a wide variety of different systems. Referring now in particular to FIG. 4, a side elevation view of an aircraft 400 having one or more of the disclosed embodiments of the present invention is shown. With the exception of the embodiments according to the present invention, the aircraft 400 includes components and subsystems generally known in the pertinent art, and in the interest of brevity, will not be described further. The aircraft 400 generally includes one or more propulsion units 402 that are coupled to wing assemblies 404, or alternately, to a fuselage 406 or even other portions of the aircraft 400. Additionally, the aircraft 400 also includes a tail assembly 408 and a landing assembly 410 coupled to the fuselage 406. The aircraft 400 further includes other systems and subsystems generally required for the proper operation of the aircraft 400. For example, the aircraft 400 includes a flight control system 412 (not shown in FIG. 4), as well as a plurality of other electrical, mechanical and electromechanical systems that cooperatively perform a variety of tasks necessary for the operation of the aircraft 400. Accordingly, the aircraft 400 is generally representative of a commercial passenger aircraft, which may include, for example, the 737, 747, 757, 767 and 777 commercial passenger aircraft available from The Boeing Company of Chicago, Ill. Although the aircraft 400 shown in FIG. 4 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

With reference still to FIG. 4, the aircraft 400 may include one or more of the embodiments of the hybrid fiberglass composite structure 414, which may be present in various portions of the structure of the aircraft 400. While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A hybrid fiberglass composite structure, comprising:
   a first laminate substrate and a second laminate substrate, wherein each laminate substrate includes at least one planar layer of glass fibers and a plurality of planar layers of polymer fibers; and
   a cellular core structure interposed between the first laminate substrate and the second laminate substrate and coupled to the layers of polymer fibers in the laminate substrates.

2. The fiberglass composite structure of claim 1, wherein at least one of the first laminate substrate and the second laminate substrate further comprise a first resin layer and a second resin layer.

3. The fiberglass composite structure of claim 2, wherein at least one of the first resin layer and the second resin layer further comprise epoxy resin layers.

4. The fiberglass composite structure of claim 1, wherein the polymer fibers include one of polyethylene and polyurethane fibers.

5. The fiberglass composite structure of claim 1, wherein the polymer fibers include liquid crystalline polymer fibers.

6. The fiberglass composite structure of claim 1, wherein at least one of the first and the second laminate substrates includes glass fiber layers and polymer fiber layers in a ratio of about one to three.

7. The fiberglass composite structure of claim 1, wherein at least one of the first laminate substrate and the second laminate substrate includes glass fiber layers and polymer fiber layers in equal proportions.

8. The fiberglass composite structure of claim 1, wherein the cellular core structure further comprises a honeycomb core structure.

9. The structure of claim 1, wherein the structure is a leading or trailing edge of a wing, and wherein the glass fiber layers form outer layers and the polymer fiber layers form inner layers.

10. An aerospace vehicle, comprising:
    a fuselage; and
    wing assemblies and an empennage operatively coupled to the fuselage;
    wherein leading edges of the wing assemblies are formed by composite structures, each composite structure comprising:
    a first laminate substrate and an opposing second laminate substrate, wherein at least one of the first laminate substrate and the second laminate substrate further include at least one polymer fiber layer and at least one glass fiber layer; and
    a cellular core structure interposed between the first laminate substrate and the second laminate substrate and fixedly coupled to the first laminate substrate and the second laminate substrate.

11. The aerospace vehicle of claim 10, wherein at least one of the polymer fiber layers includes a polyethylene fiber layer or a liquid crystalline polymer fiber layer.

12. An aircraft structure comprising a contoured panel forming a leading or trailing edge of the structure, the panel including a honeycomb core sandwiched between first and second laminate substrates, each laminate substrate including a plurality of layers of glass fibers and a plurality of layers of polymer fibers, the polymer fiber layers between the core and the glass fiber layers.

13. The structure of claim 12, wherein the structure is a wing.

14. The structure of claim 12, wherein the polymer fibers include at least one of polyethylene and polyurethane fibers.

15. The structure of claim 12, wherein the polymer fibers include liquid crystalline polymer fibers.

* * * * *